Sheet 3—7 Sheets.
C. Wheeler Jr.
Mower.
№ 41556. Patented Feb. 9, 1864.
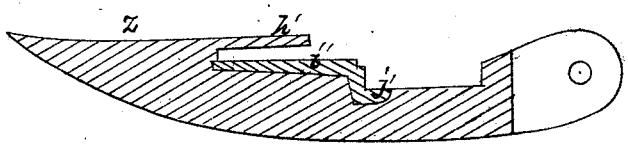
Fig. 3.
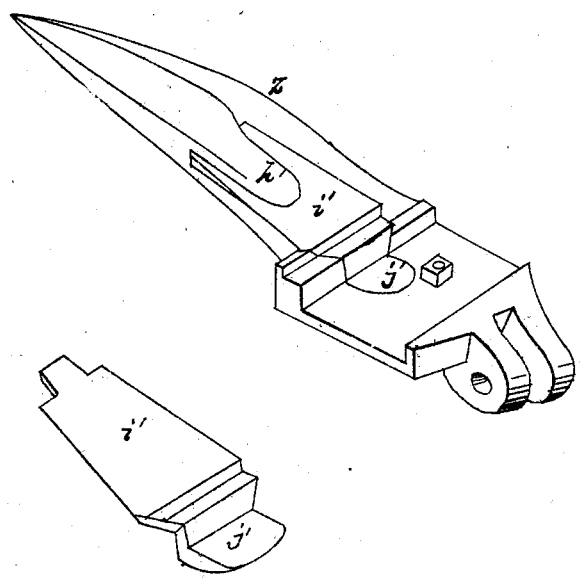
Fig. 4.
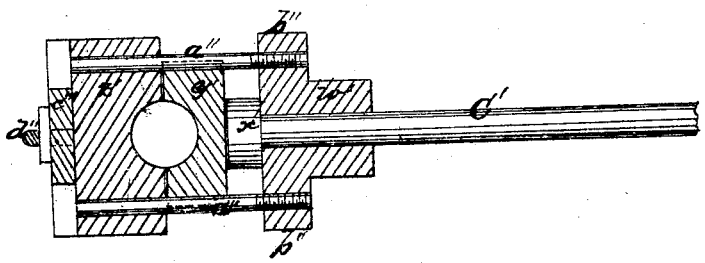
Witnesses.
Inventor
C. Wheeler, jr C. Wheeler Jr.
Mower.
N° 41556. Patented Feb. 9, 1864.
Sheet 6  7 Sheets
Fig. 7.
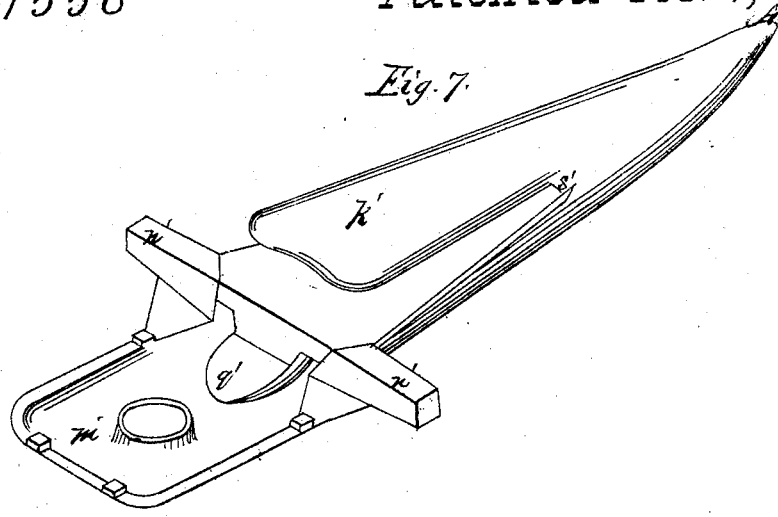
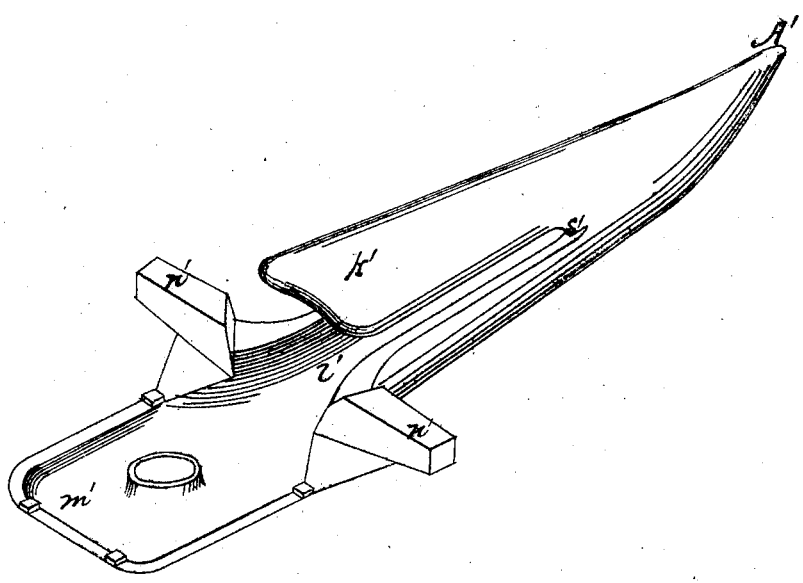
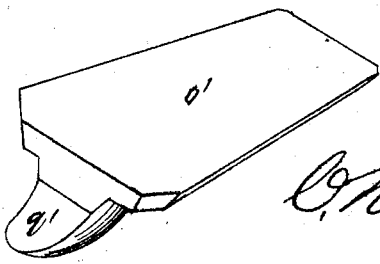
Witnesses.
N B Stoughton
Xaver Friedrich
Inventor,
C Wheeler, jr C. Wheeler Jr.
Mower.

№ 41556  Patented Feb. 9, 1864.

Witnesses.  Inventor.

UNITED STATES PATENT OFFICE.

CYRENUS WHEELER, JR., OF POPLAR RIDGE, NEW YORK.

IMPROVEMENT IN HARVESTING-MACHINES.

Specification forming part of Letters Patent No. 41,556, dated February 9, 1864.

*To all whom it may concern:*

Be it known that I, CYRENUS WHEELER, Jr., of Poplar Ridge, in the county of Cayuga and State of New York, have invented certain new and useful Improvements in Harvesting-Machines; and I do hereby declare that the following is a full, clear, and exact description of the construction and operation of the same, reference being had to the accompanying drawings, making a part of this specification, in which—

Figure 1:
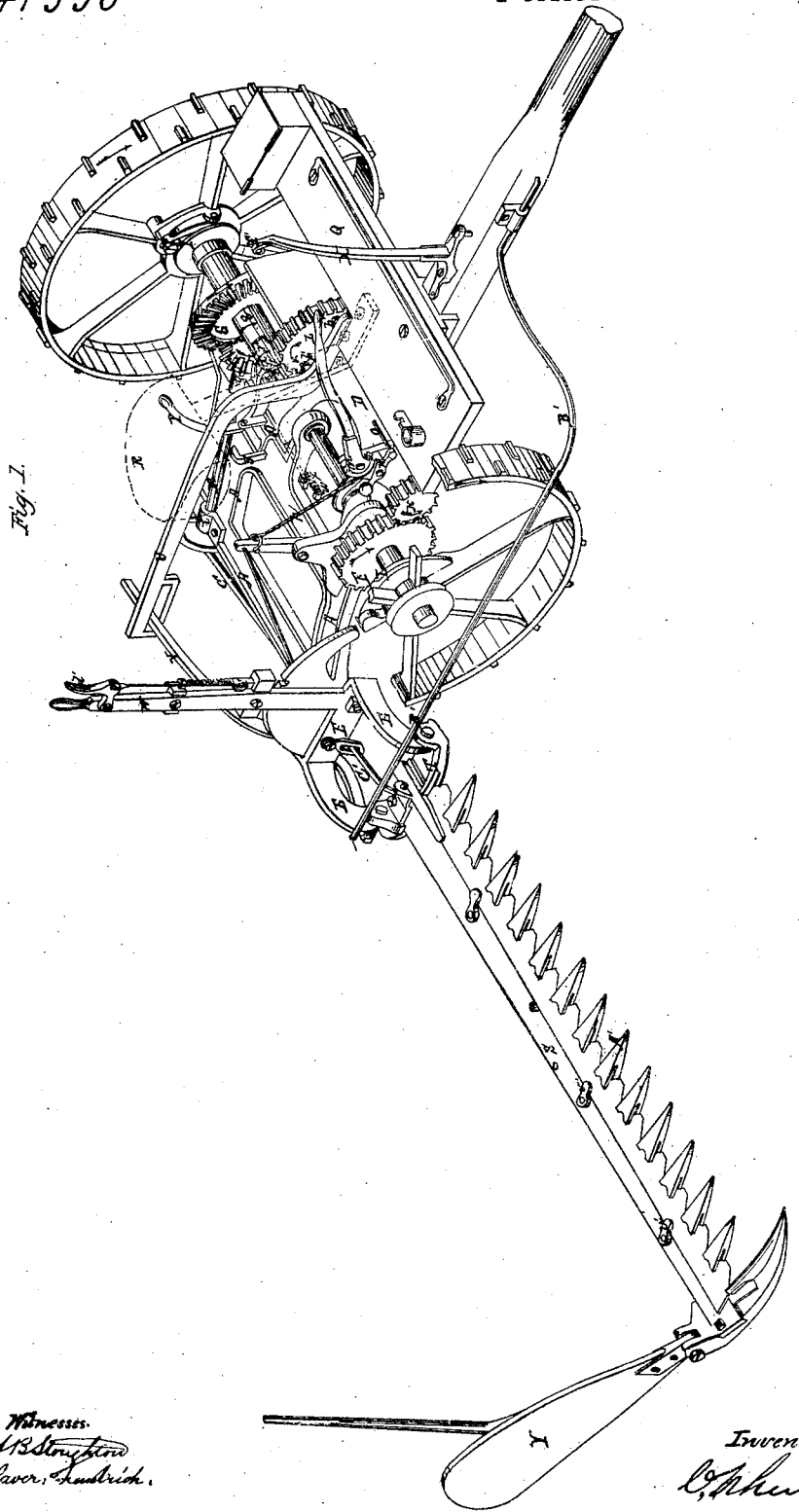
Figure 2:
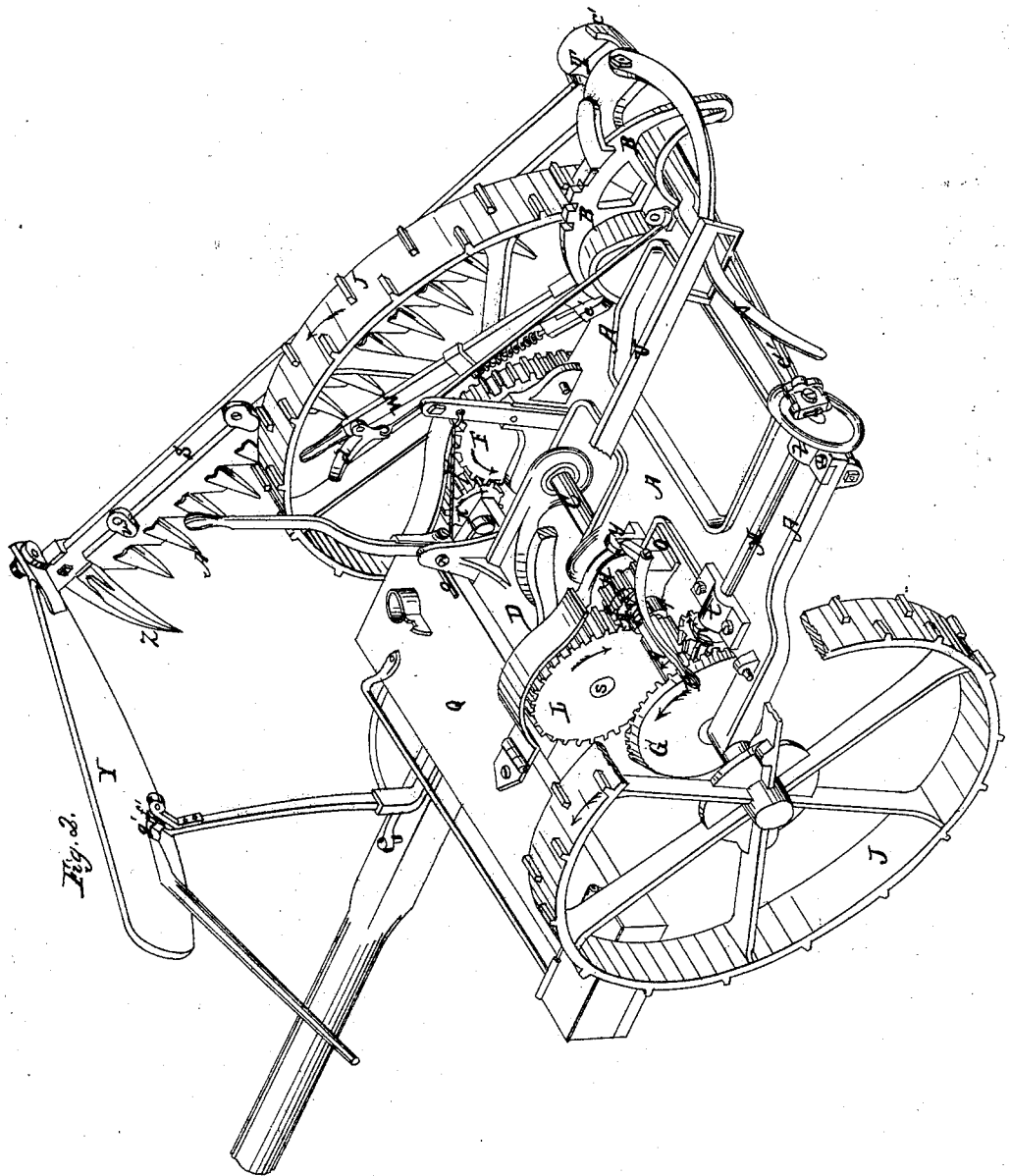
Figure 5:
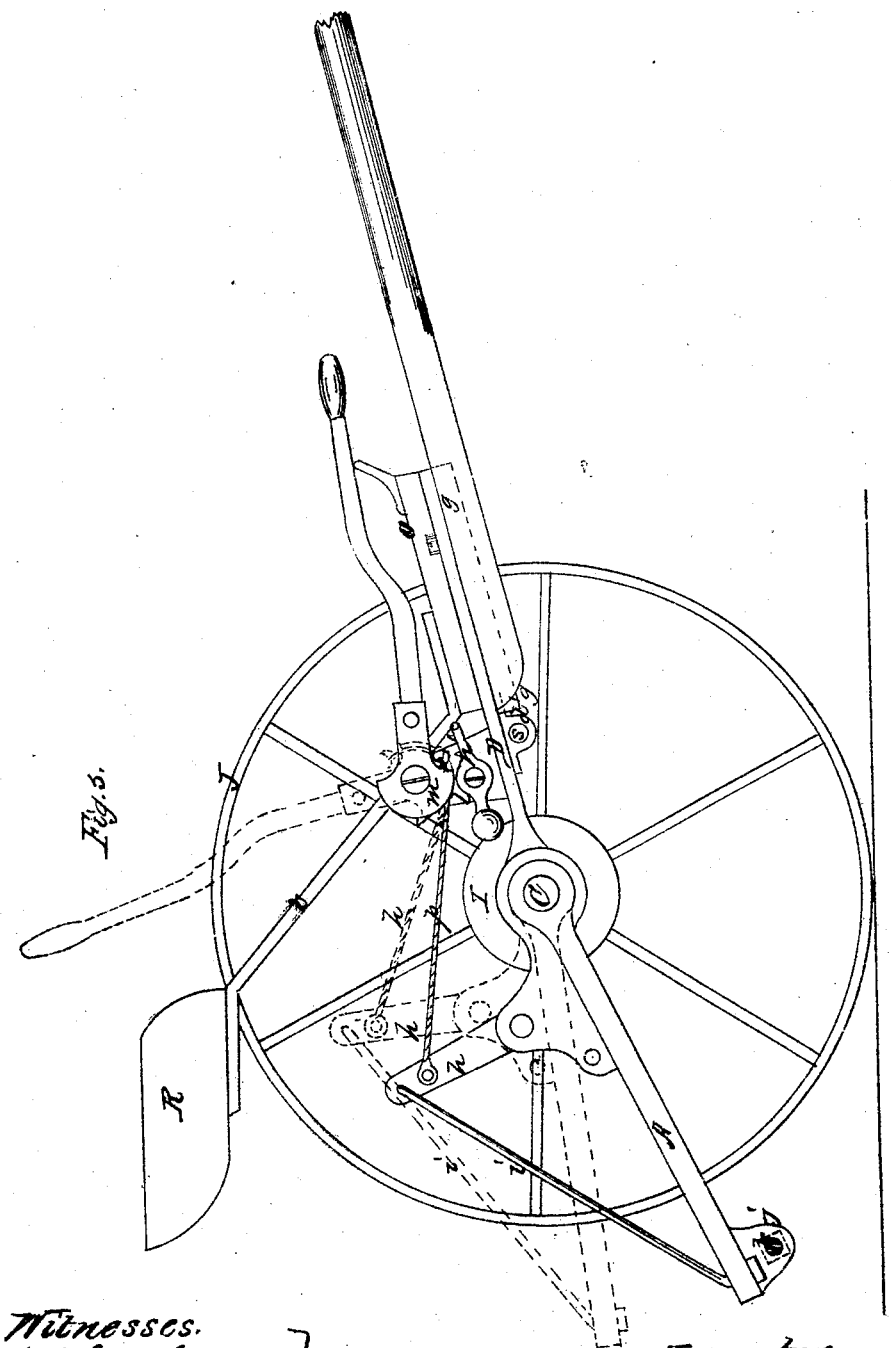
Figure 6:
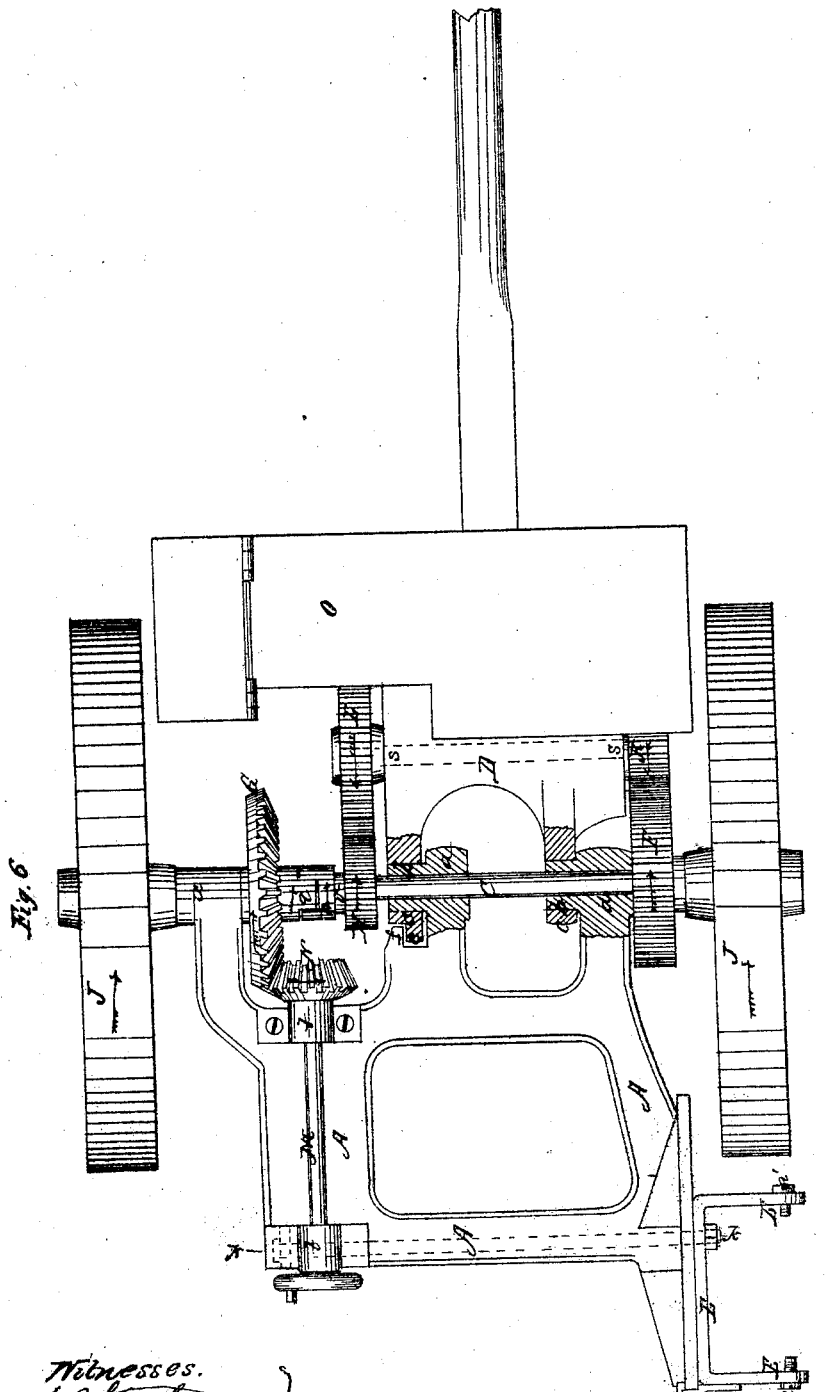
Figure 8:
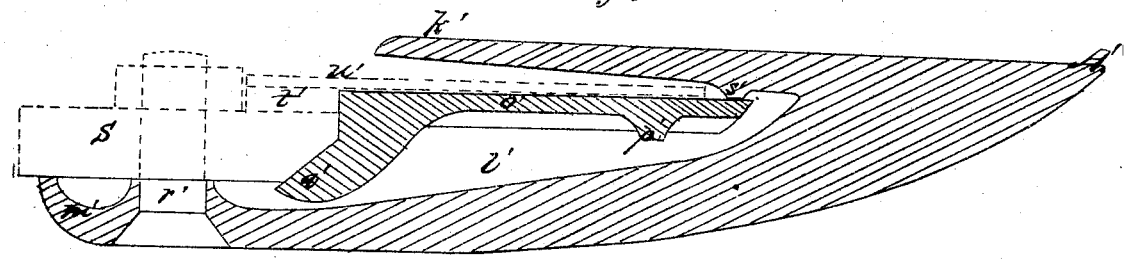
Figure 9:
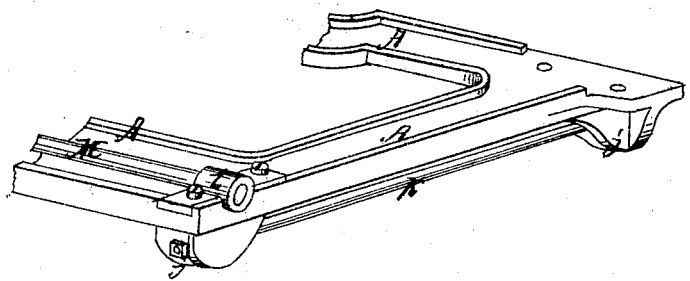

Figure 1 represents a perspective view of the machine arranged for mowing grass. Fig. 2 represents in perspective the same machine as "folded up" for transportation. Fig. 3 represents the outside divider and its ledger-plate in perspective, as also the divider in section. Fig. 4 represents a section through the pitman-connection, and on an enlarged scale to more clearly show its parts. Fig. 5 represents a section through the main frame and tongue-block, showing the lifting mechanism. Fig. 6 represents a top view of the frame and gearing, partially in horizontal section to show the mode of uniting the frames and of hanging the gearing. Fig. 7 represents a perspective view of one of the guards and its ledger-plate. Fig. 8 represents a longitudinal vertical section through one of the guards. Fig. 9 represents a rear view of the main frame, showing the long bolt for holding the cutting apparatus to and for strengthening the main frame.

Similar letters of reference, where they occur in the separate figures, denote like parts of the machine in all cases.

The nature of this invention consists, first, in the construction of a main frame in one piece of peculiar form, having three bearings for the main axle, and uniting to it a gear-block constructed in one piece of peculiar form, so that the main axle of the machine will be the center of oscillation for both, and connecting the tongue to the gear-block, so that the draft applied to propel the machine will be exerted directly upon the main frame and as low as the center of rotation of the drive-wheels, and in giving additional support to the main frame; also, in mounting the gearing on the main axle and on the gear-plate and main frame, so as to get it near the center of the machine in a compact form, while with a short main frame a long journal for the crank-shaft is thus obtained, and at the same time the bevel-wheel and the pinion to which it gives motion are kept perfectly in mesh, and are not injuriously affected by the vibrations of the main frame; and, also, in the arrangement of the gearing whereby the main gear-wheel, through which motion is imparted from the main axle, and the bevel-wheel on the same axle shall both revolve in the same direction, said axle being the center of oscillation for both the main frame and the gear-block.

It further consists in devices for clutching and unclutching the pinion from the bevel-wheel, to which it transmits motion; also, in an arrangement of self-acting levers for raising the outer end of the cutting apparatus.

It further consists in a combination of levers and lifting devices, so that the hinged cutting apparatus can be raised in its entire length from the ground by the operator, and so that it can be folded up and fastened for transportation without changing or removing any part thereof.

To enable others skilled in the art to make and use my invention, I will proceed to describe the same with reference to the drawings.

A is the main frame, constructed in one piece, which, in order to give both it and the main axle a good support, is furnished with three boxes, *a*, two of which have pipe-connections *b*. The rear corner of that side of the main frame next the cutting apparatus is curved outward in order to bring the center of the inner shoe of the cutting apparatus in a line with a plane formed by the outer rim of the inner drive-wheel, J.

B is a quadrant bolted to the corner of the main frame A.

The boxes *a* may be cast with chambers, and these lined with "Babbitt metal," to form the bearings for the main axle C.

D is a gear-block, constructed in one piece, having two sleeves, *c*, with holes in them to correspond with the pipe-projections *b* of the main frame. On the under side of the gear-block, and at each side thereof, there are boxes *d* for carrying a shaft, *s*. The boxes may be cast with chambers, which may be "babbitted" for bearings. On one of the sleeves there is a rib, *e*, extending part way around it, and on the main frame A there is a lip, *f*, which serves with the rib, when the gear-block is united to the main frame, to keep said gear-block from sliding laterally. To unite the gear-block and main frame, the gear-block is turned down at its front end, so as to be at right angles to the plane of the main frame, in which position the sleeve *c* of the gear-block will readily slip onto the pipe-projection *b* of the main frame. Then by raising the front end of the gear-block, so as to bring it in the same plane with the main frame, the rib *e* on the sleeve will lock inside of the lip *f*, and when thus united the gear-block is free to vibrate on the pipe-boxes of the main frame as its radial center and within any limit required for practical use, while it is restrained from lateral play. To make the point of draft low down on the machine, there is a recess, *g*, formed on the under side of the gear-block for connecting the tongue therewith.

As the main frame, at the corner and side to which the cutting apparatus is connected, will be subjected to sudden strains, and has to carry a great share of the weight of the cutting apparatus when raised for passing obstructions, a support is formed by the standard *h* and rod *i*, which are connected to each other and to the main frame for this purpose, as shown in the drawings; and, as a further support, the two ears *j* are projected downward from the rear of the main frame at its opposite corners, and the bolt *k* (that fastens the hinge-piece E to the main frame) passes through both, and is fastened by a nut screwing against the ear at the opposite corner from said hinge-piece.

To provide means for lifting and holding the main frame above the ground, a standard, *l*, is erected on the gear-block, and to the upper part of this standard is fastened a chain-wheel, *m*, by a pivot-bolt, on which it will freely turn. This chain-wheel has a lever connected with it for operating it. Below the chain-wheel, on the same standard, is pivoted a dog or catch, *n*, weighted at its rear end sufficiently to insure the locking of its front end at all times with notches in the periphery of the wheel prepared for its reception; and to admit of readily throwing the dog out of its notch, a rod, *o*, is attached to a branch of the dog forward of the standard *l*, so that the driver, by placing his heel upon it, can throw it out of its notch at pleasure. A chain, *p*, also extends from the chain-wheel *m* to and is united with the standard *h* on the main frame.

The gear-wheel F is keyed to the main axle C, and the bevel-wheel G has a sleeve and clutch, *q*, connected with it, said wheel and sleeve having a central opening of sufficient size to permit the main axle C to freely turn in. To lock or work with this bevel-wheel G, a pinion, H, is provided, having a sleeve and clutch, *r*, corresponding with the clutch of the bevel-wheel, and having an opening of the same size of that of the bevel-wheel, for a similar purpose. The main axle C, having the main gear-wheel F upon it, is inserted in the boxes *a* of the main frame, and passes through the pinion H and bevel-wheel G. And to the main axle, outside of the main gear-wheel F, as also to its opposite end, outside of the main frame, are firmly fastened the ratchets I. On each end of the main axle is loosely fitted a driving-wheel, J, each carrying a pawl to lock it with its respective ratchet-wheel I when the machine advances.

To communicate motion from the main gear-wheel F to the bevel-wheel H, a second shaft, *s*, is provided and inserted in the boxes D of the gear-block D, and to one end of this shaft is firmly fixed the pinion K, so as to mesh with the main gear-wheel F, and to the other end of said shaft is firmly affixed a spur-gear wheel, L, so as to mesh with the pinion H on the main axle C. The advancing movement of the driving-wheels over the ground imparts a rotary motion to the main gear-wheel F in the direction of the arrow, which in its turn imparts a rotary motion to the pinion K and gear-wheel L in the direction of the arrows upon them. The gear-wheel L imparts motion to the pinion H and the bevel-wheel G, with which it clutches, and in the direction of the arrow shown on said bevel-wheel, which is the same direction as that in which the main gear-wheel F moves. It will be observed that the bevel-wheel, being mounted on the main axle as its center of rotation and revolving in the same direction with it, though with an increased velocity, must necessarily be subject to less friction than when mounted on a shaft having separate bearings.

To provide for the unclutching of the pinion H from the bevel-wheel G, space is left on the main axle C, between the pinion and the middle box, *a*, of the main frame, to permit it to slide out of its lock. And to communicate motion from the bevel-wheel G, a counter-shaft, M, provided with a pinion, N, is arranged on the main frame A in suitable bearings, *t*, so as to gear with the bevel-wheel. The shaft M being at right angles to the main axle C, the main axle being the center of oscillation for the main frame, it follows that the main axle C becomes the radial center of the shaft M, so that the teeth of the pinion N will coincide with those of the bevel-wheel G in every position of the main frame. The pipe-projections *b* of the main frame A being the center of oscillation for the gear-block D, the second shaft, *s*, carried by it, being parallel to the main shaft, the gearing carried by said gear-block and that mounted on the main axle will coincide in any position of the gear-block.

To slide the pinion H on the main axle for the purpose of clutching and unclutching said pinion from the bevel-wheel G, a slide, O, is used, having a fork, *u*, that embraces the groove *v*, which encircles the sleeve of said pinion H. The slide O has suitable supports on the under side of the main frame, and to the slide is fastened a bolt, *w*, passing loosely through a hole in an ear fastened to the main frame. This bolt also passes through a spiral spring, $x$, which serves to draw the slide in the direction of the arrow.

To a flange on the upper side of the slide O is pivoted the lever P, which at its short end presses against a stand, $y$, that serves when the long arm of the lever is elevated to hold the slide back against the recoil of the spring $x$, and when the arm is depressed permits the spring to act upon the slide O.

The foot-board Q is bolted to the upper side of the gear-block, and on this is mounted the seat R by a spring, $z$.

The finger-bar S, carrying the cutting apparatus, is fastened to the shoe T, which is connected by pivot-bolts $a'$ to the hinge-piece E, the pivot-bolts serving as the center of radial oscillation for the cutting apparatus and the bolt $k$ of the hinge-piece as the point of rotation.

In order to elevate the outer end of the cutting apparatus from the ground, the longitudinal lever U is fastened at its forward end by ears $b'$ to the gear-block, and its rear end, which extends back beyond the rear end of the main frame, has a long loop in it for the reception of the transverse lever V. The transverse lever V is pivoted at one end to the shoe and hinge-piece by the rear pivot-bolt, $a'$, and on the inner edge of the shoe T, under the transverse lever, a rib, $c'$, is raised as a bearing-point for the lever V. The lever V is curved upward, and at its outer end passes through the loop of the longitudinal lever U.

The operator, by means of the lifting device on the gear-block, can raise the rear part of the main frame, and with it the inner end of the cutting apparatus hinged to it, and as the inner end of the cutting apparatus rises the rib $c'$ on the shoe T is brought against the lever V and causes the outer end of the cutting apparatus to rise also, the transverse lever being self-acting.

When it is desired to fold up the cutting apparatus it is first raised from the ground by the lifting devices. The outer end is raised to a vertical position, when, by means of the thumb-lever $d'$, the bolt $e'$ can be thrown out from the notches of the quadrant B, and the cutting apparatus will then turn down outside of the drive-wheel, and the graduating-lever W on the inside of the wheel. To fasten the cutting apparatus when thus folded up and prevent it from swinging outward from or inward against the driving-wheel, a standard, X, is provided and fastened to the top of the tongue, having a prong, $f'$, over which is slipped the loop $g'$ of the track-board Y.

The shoe Z has a cap or upper portion, $h'$, for supporting the crop as it is acted upon by the cutter. To enable it to accomplish the work more effectually, a recess is formed in the body of the shoe, below the cap, for the reception of a ledger-plate, $i'$. The ledger-plate has a shank, $j'$, which locks under the finger-bar S, where the shoe is bolted to it. The front end of the ledger-plate is fastened by inserting it in a cavity formed at the end of the slot of the shoe. The inside of the ledger-plate is beveled under, so as to form a sharp corner on its upper side, and when inserted in the shoe overhangs the body of the shoe below it, like a ledge. The ledger-plate can be removed, sharpened, and replaced at pleasure.

The guard-fingers A$'$ are formed with an upper part or cap-piece, $k'$, to support the crop when acted upon by the cutters. The bodies of the guards, below the caps, have grooves $l'$, extending from their heels $m'$ forward under the points of intersection of the cap-pieces $k'$ with the bodies of the guards. On either side of each guard, in front of its heel $m'$, are bars $n'$, which are raised above the body of the guard a distance equal to the thickness of the ledger-plate O$'$. This ledger-plate is wider at the rear than at its front end, and wider than the body of the guard below it, and is chamfered at both edges, so as to make an acute angle with the upper surface of the guard. On the under side, near its front end, it has a rib, $p'$, equal in length to the width of the groove in the body of the guard, where it is inserted. The rear end of the plate has a shank, $q'$, formed with it or riveted to it, that projects downward and back from it, so that when inserted in place it will, when the plate is fixed in its position in the guard, lock under the finger-bar and be held fast by the bolt $r'$, that secures the guard to the finger-bar S. The plate is inserted in the guard by sliding it under the cap $k'$ and depressing its point, so as to pass it under the lip or ledge $s'$, when the rear end of the plate will drop in between the bar $n'$, which will hold it from lateral or backward movements. The back part of the bars $n'$ rest against the front edge of the finger-bar S, and are enough higher than the upper surface of the finger-bar to give room for the knife-rod $t'$ between it and the cutter $u'$. The cutter $u'$ is fastened at its heel to the top of the knife-rod, which rests on the finger-bar S when in its position, the front or cutting part of the knives or cutters projecting forward of the bars $n'$ and working over the ledger-plates, the cutters being kept down by the clips $v'$. By removing the bolt $r'$ the ledger-plate can be removed and sharpened at pleasure, or a new one inserted.

To prevent the crop, when it leans, from being run down by the wheel, the rod B$'$ is fastened at one end to the tongue. Thence it bends downward and outward around the drive-wheel, and backward, so that its rear end will be above and over the inner end of the cutting apparatus.

C$'$ is the pitman, passing through a swivel-piece, $w'$, and having a head, $x'$, which abuts against the crank-box $y'$. The other box, $z'$, has holes at each end, through which the bolts $a''$ pass and screw into the ears $b''$ of the swivel-piece. The bolts have square heads, which are kept from turning by a plate, $c''$, slipping over a projection, $d''$, of the box $z'$, in which it is fastened by inserting a pin in a hole prepared for that purpose.

As another and a separate application will be made for another division of this improvement, further description in this application is deemed unnecessary.

One mode of applying the improvements having been shown and described, it is obvious that modifications of the improvements may be applied to other mowing and reaping machines than those herein particularly described and shown; or the same devices may be applied in part or in whole to them.

Having thus fully described this part of my invention, what I claim under this application, and desire to secure by Letters Patent, is—

1. The gear-block carrying a gear-wheel, constructed in the form and operating in the manner substantially as described.

2. Making the main frame, when constructed in one piece, with three bearings for the main axle, substantially as and for the purpose described.

3. The combination of the sleeves of the gear-block with the journal-boxes of the main frame when the gear-block and sleeves are constructed in one piece, substantially as described.

4. The segment-rib on the sleeve of the gear-block, in combination with the lip on the main frame, for preventing lateral play to the gear-block, substantially as described.

5. Connecting the tongue to the gear-block, constructed in one piece, by a recess formed in the gear-block on its under side for the purpose of lowering the draft, substantially as described.

6. The combination of the standard and brace-rod for additional support to the main frame, substantially as described.

7. The two ears on the lower side of the rear corner of the main frame, in combination with the long bolt for the purpose of connecting the hinge-piece, and as an additional support to the rear part of the main frame, substantially as described.

8. The combination of the lifting devices, mounted on the standard of the gear-block, and the standard on the main frame, united by a flexible connection, substantially as described.

9. The combination of the weighted dog with the lifting device, so as to hold the lifting device in a fixed position when the main frame is raised, and so that the operator can with his foot release the dog from the lifting device at pleasure for the purpose of lowering the main frame, substantially as described.

10. Mounting two driving-wheels—the main gear-wheel and the bevel-wheel—on the main axle, substantially as described.

11. Mounting the main gear-wheel, bevel-wheel, and pinion locking with it on the main axle, substantially as described.

12. Communicating motion from the main gear-wheel to the bevel-wheel on the main axle by a shaft mounted in bearings on the gear-block, carrying a pinion gearing with the main gear-wheel and a spur-wheel gearing with the pinion on the main axle, substantially as described.

13. The combination of gearing whereby the bevel-wheel and its pinion mounted on the same axle with the main gear-wheel shall revolve in the same direction as the main gear-wheel, substantially as described.

14. Mounting the bevel-wheel having a sleeve provided with a clutch, and the pinion having a sleeve and clutch, both on the main axle, and so arranging and combining them with the main frame and gear-block as that the pinion may be moved longitudinally on the main axle for the purpose of clutching the pinion with and unclutching it from the bevel-wheel, substantially as described.

15. Mounting the bevel-wheel on a sleeve on the main axle, in combination with the main frame vibrating independent of the gear-block, and carrying a counter-shaft having a pinion gearing with said bevel-wheel, substantially as described.

16. The arrangement of the lever, slide, and spring by which the clutching and unclutching of the pinion with the bevel-wheel is performed, substantially as described.

17. In combination with a main frame vibrating independently of the gear-block, mounting the foot-board and seat on the gear-block, and fastening the tongue to the under side thereof, substantially as described.

18. The longitudinal lever fastened to the gear-block, in combination with the transverse lever pivoted to the shoe for the purpose of raising the outer end of the cutting apparatus, substantially as described.

19. The combination and arrangement of the longitudinal and transverse lever, with the gear-block, main frame, and cutting apparatus, so that the cutting apparatus can be folded up and fastened without detaching any part of the machine, substantially as described.

20. The combination and arrangement of the lifting devices with the gear-block and main frame and the longitudinal and transverse levers with the cutting apparatus, so that the cutting apparatus may be raised from the ground at pleasure by the operator from his seat, substantially as described.

C. WHEELER, JR.

Witnesses:
A. B. STOUGHTON,
EDM. F. BROWN.